United States Patent [19]

Guertin

[11] Patent Number: 4,470,096
[45] Date of Patent: Sep. 4, 1984

[54] MULTILAYER, FULLY-TRIMMABLE, FILM-TYPE CAPACITOR AND METHOD OF ADJUSTMENT

[75] Inventor: Patrick W. Guertin, Sunrise, Fla.

[73] Assignee: Motorola Inc., Schaumburg, Ill.

[21] Appl. No.: 390,141

[22] Filed: Jun. 18, 1982

[51] Int. Cl.³ .................. H01G 5/00; H01G 7/00
[52] U.S. Cl. .................. 361/277; 29/25.42
[58] Field of Search ........... 29/25.42; 361/301, 313, 361/321, 271, 272, 277

[56] References Cited

U.S. PATENT DOCUMENTS

| | | | |
|---|---|---|---|
| 1,580,057 | 4/1926 | Lewis | 29/25.42 |
| 1,899,176 | 2/1933 | Bailey | 361/275 |
| 2,139,453 | 12/1938 | Linder | 361/272 X |
| 2,405,529 | 8/1946 | Smith | 361/321 |
| 2,696,577 | 12/1954 | Smith | 361/321 |
| 2,952,064 | 9/1960 | Randels | 29/25.42 |
| 3,267,342 | 8/1966 | Pratt et al. | 361/321 |
| 3,496,435 | 2/1970 | Manley | 361/301 |
| 3,815,187 | 6/1974 | Hanold | 29/25.42 |
| 3,821,617 | 6/1974 | Shelby et al. | 29/25.42 |
| 4,007,296 | 2/1977 | Ansell et al. | 29/25.42 X |
| 4,074,340 | 2/1978 | Leigh | 361/321 |
| 4,189,760 | 2/1980 | Marshall | 361/321 |
| 4,190,854 | 2/1980 | Redfern | 361/271 X |
| 4,238,661 | 1/1980 | Braunlich | 219/121 LN |
| 4,238,662 | 12/1980 | Lao | 219/121 LN |

Primary Examiner—Donald A. Griffin
Attorney, Agent, or Firm—Rolland R. Hackbart; James W. Gillman; Edward M. Roney

[57] ABSTRACT

A thick film capacitor with more than two layers configured to enable trimming of the lower layers to increase the capacitance per area ratio while maintaining a linear trimmability of the capacitor's complete range.

10 Claims, 4 Drawing Figures

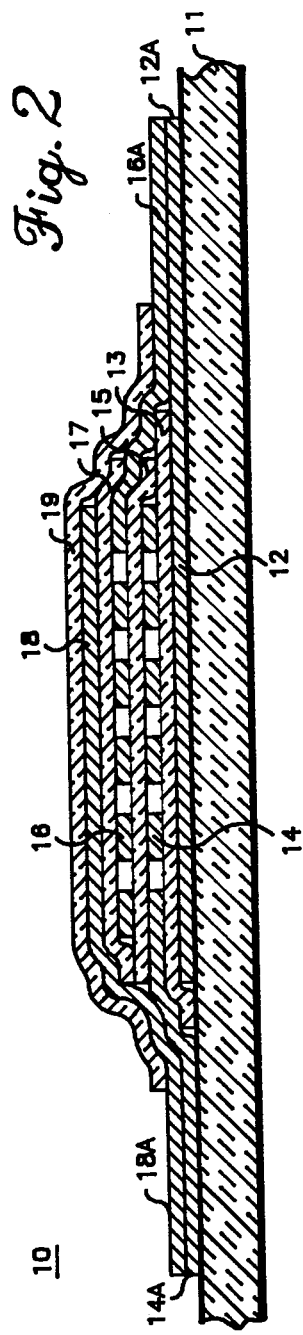
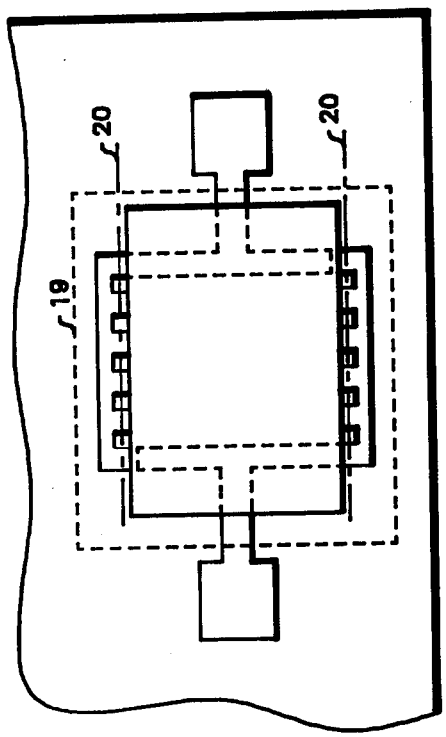
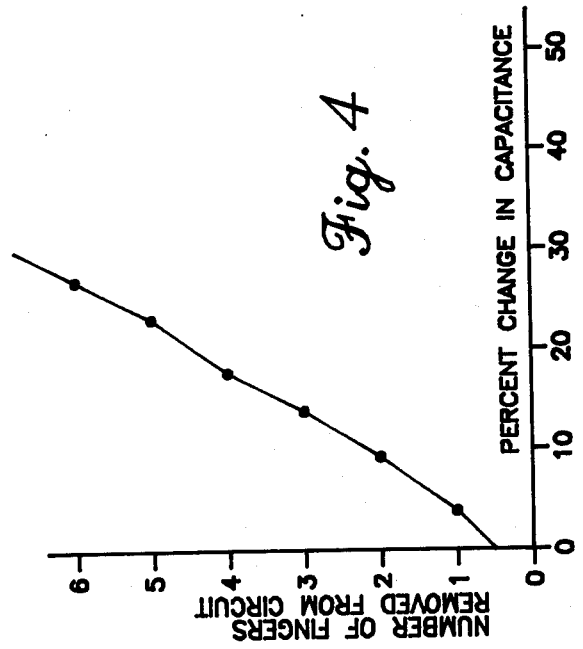

MULTILAYER, FULLY-TRIMMABLE, FILM-TYPE CAPACITOR AND METHOD OF ADJUSTMENT

BACKGROUND OF THE INVENTION

Thick film capacitors usually comprise a lower and upper electrode with a dielectric layer between. During the thick film manufacturing process, a number of variables will affect the ultimate value of a capacitor. Variations in materials, alignment and thickness of printed components all contribute to variations in the final component. Typically, a printed capacitor placed at a critical point in a circuit will be trimmed in the circuit until the capacitor achieves a desired circuit performance.

Capacitors in the past have been adjusted by abrasively trimming the upper layers until the area of the upper layer provides a capacitor of the desired value. This has required leaving the newly printed capacitor exposed to environmental influences until the part has been trimmed and encapsulated. There are a number of prior art devices and methods of making them. A typical prior method teaches that a tail portion on the upper layer of the thick film capacitor is to be abraded to arrive at a desired capacitance. The capacitor is then encapsulated, but the component is exposed during the entire trimming process.

As technology has progressed, thick film circuits have increased in density, and conventional dual electrode capacitors have required a disproportionate amount of substrate area. Furthermore, it is now desirable to design a capacitor which can withstand laser or optical trimming. Conventional thick film capacitors which are trimmed by abrasive methods can be fabricated with dielectric materials which have dielectric constants as high as $E_r = 20$. It has been shown that materials which can withstand laser trimming have dielectric constants only as high as $E_r = 10$. In order to design a capacitor which can withstand laser trimming, it would necessarily be twice as large as a capacitor designed to be abraded. The present invention overcomes these problems by providing a thick film capacitor which is linearly trimmable over its entire range. The present invention incorporates a unique layout in which one or more of the lower layers of the electrodes are compared to segmented fingerlike electrodes partially exposed to enable electrical isolation through trimming. This arrangement provides a Fifty Percent (50%) increase in a capacitance per unit area while incorporating materials which can withstand laser trimming. Furthermore, the capacitor is encapsulated prior to trimming and, therefore, provides a component which is more stable during the manufacturing process.

SUMMARY OF THE INVENTION

It is therefore, an object of this invention to provide a capacitor, with a plurality of layers, which is linearly trimmable over its entire range.

It is another object of this invention to increase the capacitance per area ratio of a thick film capacitor.

It is still another object of this invention to provide a capacitor which will withstand optical or a laser trimming.

Thick film capacitors embodying the preferred practice of the present invention comprise depositing on an insulating substrate a plurality of metallic layers with insulating layers therebetween and with the intermediate metallic layers comprising segmented fingerlike electrodes partially exposed to enable electrical isolation through trimming. The capacitor is then passivated or encapsulated, and the capacitor is then adjusted by isolating each segmented finger until a desired capacitance is achieved. The top layer is further trimmed if the lower layer trim did not achieve the desired capacitance.

BRIEF DESCRIPTION OF THE DRAWINGS

The novel features of this invention are set forth with particularity in the appended claims. The invention itself, however, in its construction, together with additional objects and advantages thereof, will be best understood from the following description of specific embodiments when read in connection with the accompanying drawings, in which:

FIG. 2 is a cross-sectional view taken along lines 2—2 of FIG. 1.

FIG. 3 is a top plan view demonstrating how each segmented finger of the capacitor of FIG. 1 is isolated from the electrical circuit.

FIG. 4 is a graph demonstrating the effect of removing the segmented fingers from the electrical circuit.

DETAILED DESCRIPTION OF THE PREFERRED EMBODIMENT

Figure 1:
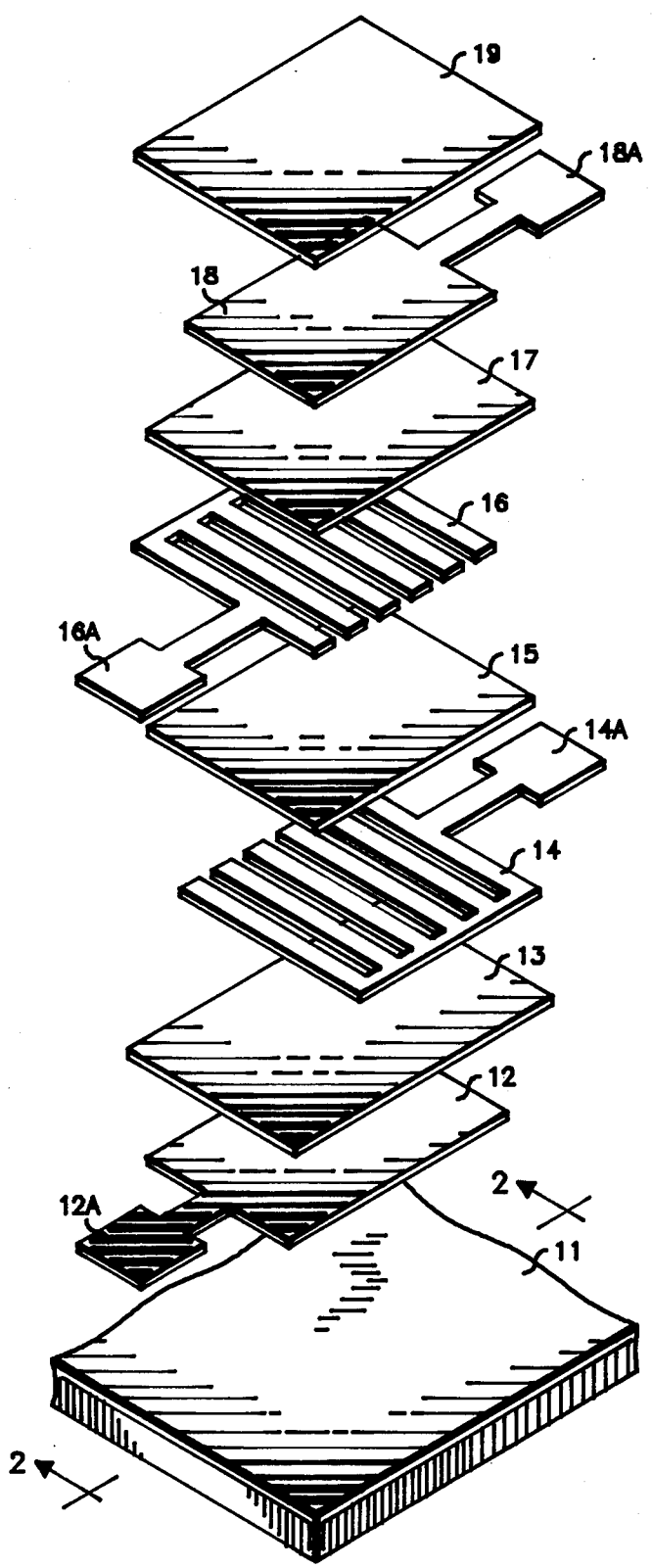
FIG. 1 is an exploded view of the thick film, multielectrode, fully-trimmable capacitor, which has been constructed in accordance with the present invention.

Referring now to the drawings, FIG. 1 shows an exploded view of the multilayer capacitor 10 which has been constructed in accordance with the present invention. The capacitor is deposited on the main substrate 11 by any suitable method such as by a conventional thick film process well known in the art. The various layers may be screened using an ink-like substance which is then fired to drive off the carrier material and leave only a metallic or dielectric substance. In the preferred embodiment, the lowermost metallic layer is formed with paladium silver ink and the middle and uppermost layers are formed with Englehart 9750 thin gold. The dielectric layers are formed with a glass of silicon dioxide and alumina. The first step comprises depositing a layer of a metal 12 which is shaped as a rectangular plate, although other shapes would function satisfactorily. A tab 12a extends from the rectangular plate which forms the first terminal of the capacitor. This layer is referred to as the first metal layer.

The next step comprises depositing a layer of dielectric material 13. This first dielectric layer is also shaped as a rectangle, and it completely overlaps the first metal layer with the exception of the terminal tab 12a. Dielectric layers may be formed of any suitable dielectric material. In the preferred embodiment, the material used is DuPont 9950 which comprises a filled glass of silicon dioxide and alumina. The next (second) metal layer 14 is then deposited. This metal layer is shaped with segmented fingerlike electrodes which are partially exposed on one edge. This edge overlaps the first dielectric layer 13. A tab 14a extends from this metal layer opposite the tab 12a in the first metal layer 12. Tab 14a forms a second terminal of the capacitor.

Next, a (second) layer of dielectric material 15 is deposited over the second metal layer 14. This dielectric layer 15 overlaps the second metal layer 14 with the exception of one side, which is exposed for trimming, and the terminal tab (best seen in FIG. 3). In the preferred embodiment, the next layer to be deposited is known as the third metal layer and is shown at 16. This layer is also configured with segmented fingerlike electrodes and is aligned so that its fingerlike electrodes are coincident with the corresponding fingerlike electrodes on the second metal layer 14. This layer also has a tap 16a which extends from a side opposite the tab 14a of second of metal layer 14. At the same time, the tab 16a of course extends in the same orientation as the tab 12a on the first metal layer 12. The tab 16a on the third metal layer 16 and the tab 12a on the first metal layer 12 are in conductive engagement after this metal layer 16 is deposited.

A third dielectric layer 17 is then deposited over the third metal layer 16. The third dielectric layer 17 completely covers the third metal layer 16 with the exception of one side of the third metal layer, which is partially exposed for trimming and the terminal tab 16a (see FIG. 3). The trimming area for the second metal layer 14 and third metal layer 16 extend from opposite sides of the capacitor, as indicated. After the third dielectric layer has been deposited, a fourth metal layer 18 is then deposited. The fourth metal layer is shaped as a rectangle with a tab 18a extending on one side. Tab 18a on the fourth metal layer 18, and the tab 14a on the second metal layer 14 are configured so as to be coincident with each other, and after deposition, the tabs on these layers are in conductive eengagement. After the various layers of the multielectrode capacitor have been deposited, a final passivating layer indicated at 19 is deposited over the entire structure.

FIG. 2 is a cross-sectional view of the multielectrode capacitor exposing section 2—2 of FIG. 1. This figure shows the relative relationship between each of the metal and dielectric layers. As can be seen from FIG. 2, the tab 12a on the first metal layer 12 is in conductive engagement with the tab 16a on the third metal layer 16. Likewise, the tab 14a on the second metal layer 14 is in conductive engagement with the tab 18a on the fourth metal layer 18. The figure also demonstrates the relationship between each of the fingerlike electrodes on the second metal layer 14 and the third metal layer 16. The alignment of these two metal layers is important, and it is preferred that these two layers be coincident so that the capacitor may function optimally. The dielectric layers 13, 15 and 17 can also be seen in this figure. The first dielectric layer 13 is placed directly over the first metal layer 12 as mentioned previously. The third dielectric layer 15 is directly over the second metal layer 14 and the fourth dielectric layer 17 is directly over the third metal layer 16. The passivating layer 19 is seen over the entire structure with the exception of the two (2) tabs 12a/16a and 14a/18a which form the input and output terminals of the capacitor. It should be noted that in an actual circuit, the terminals of the capacitor probably may not be configured specifically as tabs. They are demonstrated here as such to better highlight the location of the input and output terminals of the capacitor.

FIG. 3 is a top plan view of the assembled multilayer thick film capacitor previously described in FIGS. 1 and 2, and demonstrates the area which would be trimmed either optically or abrasively to provide a capacitor which may be adjusted to the desired value. If this capacitor is printed in a circuit, the trimming would probably best be accomplished with an automatic test system which is programmed to control a laser beam. The laser could then be employed to trim individual fingers, as shown by the dashed line 20 in FIG. 3. The laser in conjunction with an automatic test system would remove each segmented finger from the circuit, one at a time, while measuring the effect on circuit performance. When the desired circuit performance has been achieved, additional fingers would be left intact. It should be noted that this capacitor has been encapsulated prior to trimming, and after the trimming step, no further processing is needed.

FIG. 4 is a graph which demonstrates the electrical effect of removing a single segmented finger from the electrical circuit of the capacitor. As can seen from FIG. 4, each segmented finger for a four metal layer capacitor contributes to approximately Five Percent (5%) of the total capacitance of the printed capacitor. It should be noted that this invention is not limited to four layer multielectrode capacitors, and other configurations would function satisfactorily. The invention could perform satisfactorily if these were a single layer of fingerlike electrodes. Likewise, many other layers could be utilized if a high capacitance per area ratio were required.

The final structure provides a thick film multielectrode fully-trimmable capacitor which can withstand laser trimming and exhibits a high capacitance per area ratio. The resulting structure also has considerably improved reliability because it is passivated or encapsulated immediately after it is manufactured and is immune to environmental influences even before it has been trimmed.

What is claimed is:

1. The process of forming a capacitor on an insulating substrate comprising the steps of:
    (a) depositing a first metallic layer, having a terminal at one end, on said insulating substrate;
    (b) depositing a first layer of insulating dielectric material over said first metallic layer;
    (c) depositing a plurality of intermediate metallic layers, each separated by an insulating dielectric layer, over said first dielectric layer, wherein each of said intermediate metallic layers is configured as segmented finger-like electrodes partially exposed and intercoupled at one end, and wherein alternate metallic layers are coupled to the terminal of said first plate-like metallic layer;
    (d) depositing a topmost plate-like metallic layer, having a terminal at one end, over said intermediate metallic layers, wherein said terminal is further coupled to the other alternate intermediate metallic layers;
    (e) depositing a coating of insulating material over the assembled capicator;
    (f) adjusting the capacitance of said capacitor by isolating each segmented finger-like electrode until a desired capacitance is achieved; and
    (g) further trimming the topmost metallic layer of the capacitor if trimming of the segmented layers did not achieve the desired capicitance.

2. The method of claim 1, wherein isolating each segmented finger is effected by a laser beam.

3. The method of claim 1, wherein the capacitor formed includes four metallic layers interspersed with three dielectric layers.

4. The method of claim 3, wherein said first and third metallic layers are in electrical contact with one another and are coupled to one terminal of said capacitor and wherein said second and forth metallic layers are in electrical contact with one another and are coupled to another terminal of sid capicator.

5. A multilayer trimmable capacitor comprising:
(a) an insulating substrate;
(b) a plurality of metallic layers on said substrate interspersed with insulating dielectric layers; the intermediate metallic layers having segmented finger-like electrodes partially exposed and intercoupled on one side, wherein the topmost metallic layer and the bottommost layer have terminals which are alternately coupled to said intermediate metallic layers;
(c) said exposed segmented finger-like electrodes being adapted for severing to alter the observed capacitance of the assembled capacitor; and
(d) a coating of passivating material covering said capacitor.

6. The apparatus of claim 5, wherein said segmented finger-like electrodes are adapted for severing by a laser beam.

7. The apparatus of claim 5, wherein the capacitor includes four metallic layers interspersed by three dielectric layers.

8. The apparatus of claim 7, wherein said second and third metallic layers comprise said segmented fingerlike electrodes.

9. The apparatus of claim 7, wherein said first and third metallic layers are in electrical contact with one another and are coupled to one terminal of said capacitor and wherein said second and forth metallic layers are in electrical contact with one another and form another terminal and said capacitor.

10. The apparatus of claim 5, wherein the lowermost metallic layer is formed with paladium silver ink and the middle and uppermost layers are formed with gold ink, and the dielectric layers are formed with a glass of silicon dioxide and alumina.

* * * * *